United States Patent
Yang

(10) Patent No.: US 8,804,776 B2
(45) Date of Patent: Aug. 12, 2014

(54) CONNECTOR ASSEMBLY FOR CONVERTING BETWEEN PARALLEL SIGNALS AND SERIAL SIGNALS

(75) Inventor: Meng-Liang Yang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 349 days.

(21) Appl. No.: 13/253,978

(22) Filed: Oct. 6, 2011

(65) Prior Publication Data

US 2013/0072036 A1    Mar. 21, 2013

(30) Foreign Application Priority Data

Sep. 16, 2011    (CN) .......................... 2011 1 0275047

(51) Int. Cl.
*H04J 3/02*    (2006.01)

(52) U.S. Cl.
USPC .............. 370/537; 370/366; 370/464; 710/71

(58) Field of Classification Search
USPC .............................. 370/537, 464, 366; 710/71
See application file for complete search history.

(56) References Cited

U.S. PATENT DOCUMENTS 3,866,999 A * 2/1975 Doherty, Jr. .................... 439/70
7,688,869 B2 * 3/2010 Adam et al. .................. 370/537

OTHER PUBLICATIONS

"Remote 16-Bit I2C and SMBus I/O Expander With Interrupt Output and Configuration Registers", 2008, Texas Instruments.*

* cited by examiner

*Primary Examiner* — Omer S Mian
(74) *Attorney, Agent, or Firm* — Novak Druce Connolly Bove + Quigg LLP

(57) ABSTRACT

A connector assembly includes a first connector, a second connector, a first controller, an inter-integrated circuit (I2C), and a second controller. The first connector is electrically connected between a first element and the first controller. The second connector is electrically connected between a second element and the second controller. The I2C is electrically connected between the first controller and the second controller. The first connector receives and outputs a number of parallel signals from the first element. The first controller converts the parallel signals into two serial signals. The I2C transmits the two serial signals to the second controller. The second controller converts the two serial signals into a number of parallel signals.

5 Claims, 1 Drawing Sheet

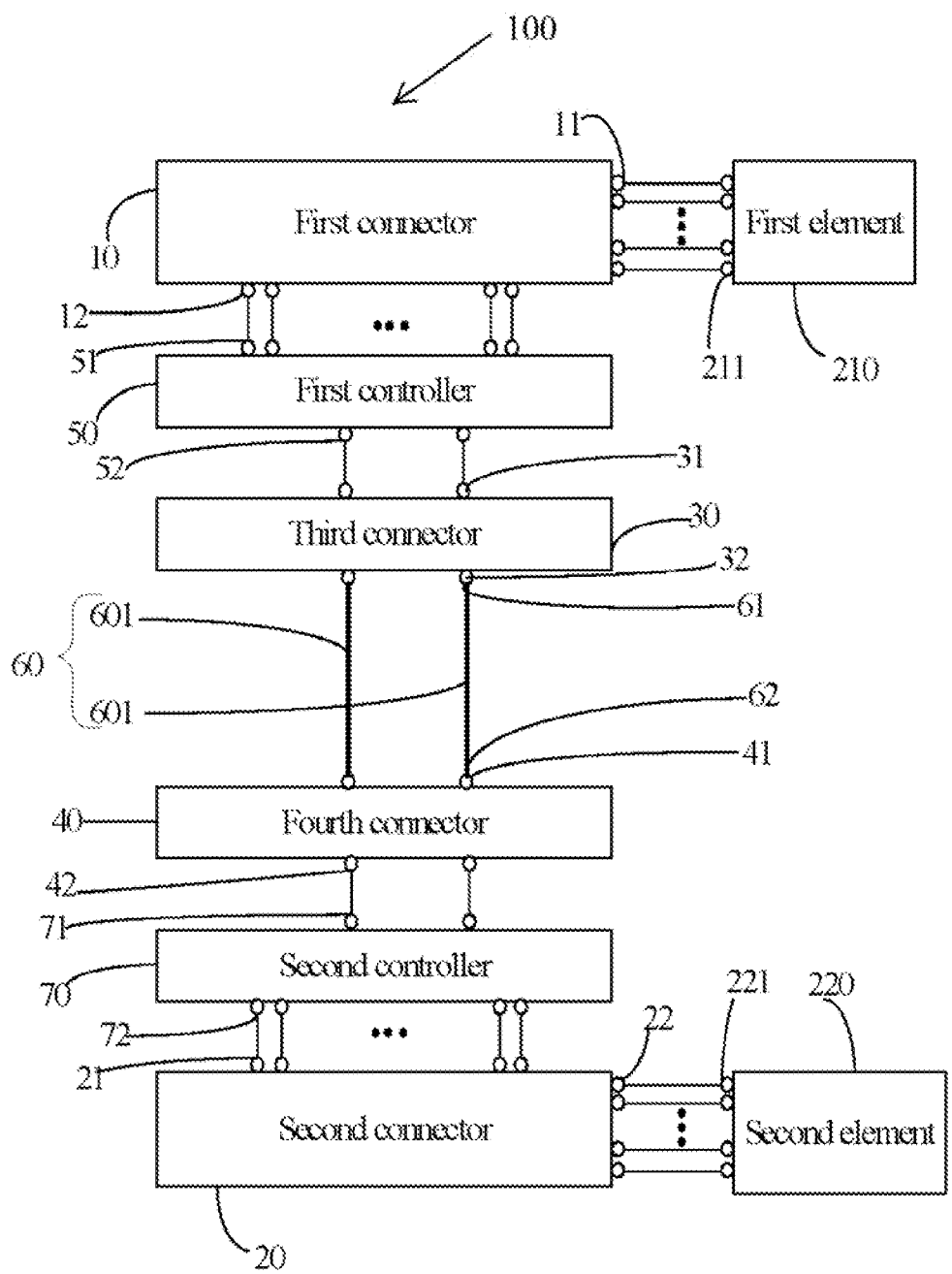

CONNECTOR ASSEMBLY FOR CONVERTING BETWEEN PARALLEL SIGNALS AND SERIAL SIGNALS

BACKGROUND

1. Technical Field

The present disclosure relates to a connector assembly for converting between parallel signals and serial signals.

2. Description of Related Art

A computer usually comprises computer case and a motherboard mounted inside the computer case. A front panel of the computer usually comprises buttons or interfaces that need to be electrically connected to the motherboard. In one example, there are a plurality of cables for transmitting multiple parallel signals between the front panel and the motherboard. The cables occupy a lot of space in the computer chassis which influences the heat dissipation of the computer.

Therefore, it is desirable to provide a connector assembly for converting between parallel signals and serial signals that can overcome the above-mentioned limitations.

BRIEF DESCRIPTION OF THE DRAWINGS

Many aspects of the embodiments should be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

The FIGURE is a schematic functional block diagram of a connector assembly, according to an exemplary embodiment.

DETAILED DESCRIPTION

Referring to the FIGURE, a connector assembly 100, according to an exemplary embodiment, is used for electrically connecting a first element 210 to a second element 220. The first element 210 may be a computer motherboard, and includes thirty output pins 211. The second element 220 may be a connector (an interface) of a front panel of a computer chassis, and includes thirty input pins 221. The connector assembly 100 includes a first connector 10, a second connector 20, a third connector 30, a fourth connector 40, a first controller 50, an inter-integrated circuit (I2C) 60, and a second controller 70.

The first connector 10 has a number of first input ends 11 and a number of first output ends 12. The first input ends 11 are electrically connected respectively to the output pins 211, and are used for receiving a number of parallel signals from the first element 210. The first output ends 12 are electrically connected respectively to the first input ends 11, and output the parallel signals. In an exemplary embodiment, the number of the first input ends 11 and the first output ends 12 is thirty. The first input ends 11 are received in a receptacle, and the output pins 211 are inserted into the receptacle to electrically connect to the first input ends 11.

The second connector 20 has a number of second input ends 21 and a number of second output ends 22. The second output ends 22 are electrically connected respectively to the input pins 221. In one exemplary embodiment, the number of the second input ends 21 is thirty, and the number of the second output ends 22 is thirty.

The third connector 30 has two third input ends 31 and two third output ends 32. The third output ends 32 are electrically connected to the third input ends 31.

The fourth connector 40 has two fourth input ends 41 and two fourth output ends 42. The fourth output ends 42 are electrically connected to the fourth input ends 41.

The first controller 50 is electrically connected between the first connector 10 and the third connector 30, and receives the parallel signals from the first connector 10, and converts the parallel signals into two serial signals. The first controller 50 has a number of fifth input ends 51 and two fifth output ends 52. The number of the fifth input ends 51 is equal to that of the first output ends 12. The fifth input ends 51 are electrically connected to the first output ends 10. The two fifth output ends 52 are electrically connected to the two third input ends 31. In one exemplary embodiment, the first controller 50 is a baseboard management controller (BMC). In other embodiments, the first controller 50 can be an I2C controller.

The I2C 60 includes two cables 601, and each of the two cables 601 is electrically connected between the third connector 30 and the fourth connector 40. Each cable 601 has a sixth input end 61 and a sixth output end 62. The sixth input end 61 is electrically connected to the third output end 32. The sixth output end 62 is electrically connected to the fourth input end 41.

The second controller 70 is electrically connected between the fourth connector 40 and the second connector 20, and converts the serial signals from the fourth connector 40 into a number of parallel signals. The second controller 70 has two seventh input ends 71 and a number of seventh output ends 72. The two seventh input ends 71 are electrically connected to the two fourth output ends 42. The number of the seventh output ends 72 is equal to that of the second input ends 21. The seventh output ends 72 are respectively connected to the second input ends 21. In one exemplary embodiment, the model number of the second controller 70 can be PCA9555PW.

In one exemplary embodiment, the first connector 10, the third connector 30, the first controller 50, and the first element 210 are mounted on a first loading plate (not shown) adjacent to the first element 210. The second connector 20, the fourth connector 40, the second controller 70, and the second element 220 are fixed on a second loading plate (not shown) adjacent to the second element 220. The I2C 60 is arranged between the first loading plate and the second loading plate, and thus the number of cables between the first loading plate and the second loading plate is reduced to improve the heat dissipation of the computer.

In other embodiments, the third connector 30 and the fourth connector 40 can be omitted; the sixth input end 61 and a sixth output end 62 of the I2C 60 are directly electrically connected to the first controller 50 and the second controller 70.

It will be understood that the above particular embodiments and methods are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A connector assembly configured for electrically connecting a first element and a second element, comprising:
   a first connector electrically connected to the first element and configured for receiving and outputting a plurality of parallel signals from and to, respectively, the first element;
   a second connector electrically connected to the second element;

a first controller electrically connected to the first connector and configured for converting the parallel signals into two serial signals;

a third connector electrically connected to the first controller, and configured for receiving the serial signals;

an inter-integrate circuit (I2C) consisting of two cables, each of the cables comprising an input end and an output end at opposite ends thereof, the input ends electrically connected to the third connector, and configured for transmitting the two serial signals;

a fourth connector electrically connected to the output ends of the I2C; and a second controller electrically connected between the fourth connector and the second connector, and configured for converting the two serial signals into a plurality of parallel signals, and the second connector configured for receiving and outputting the plurality of parallel signals from and to, respectively, the second element.

2. The connector assembly of claim 1, wherein the first connector, the first controller, and the third connector are fixed with the first element, and the second connector, the second controller, and the fourth connector are fixed with the second element.

3. The connector assembly of claim 1, wherein the first connector com rises a plurality of first input ends, the first input ends are received in a receptacle, and the output pins of the first element are inserted into the receptacle to electrically connect to the first input ends.

4. The connector assembly of claim 1, wherein the first controller is BMC or I2C controller.

5. The connector assembly in claim 1, wherein the model number of the second controller is PCA9555PW.

* * * * *